Nov. 17, 1964  R. K. POTTLE  3,157,318
DUST GUN
Filed June 29, 1962
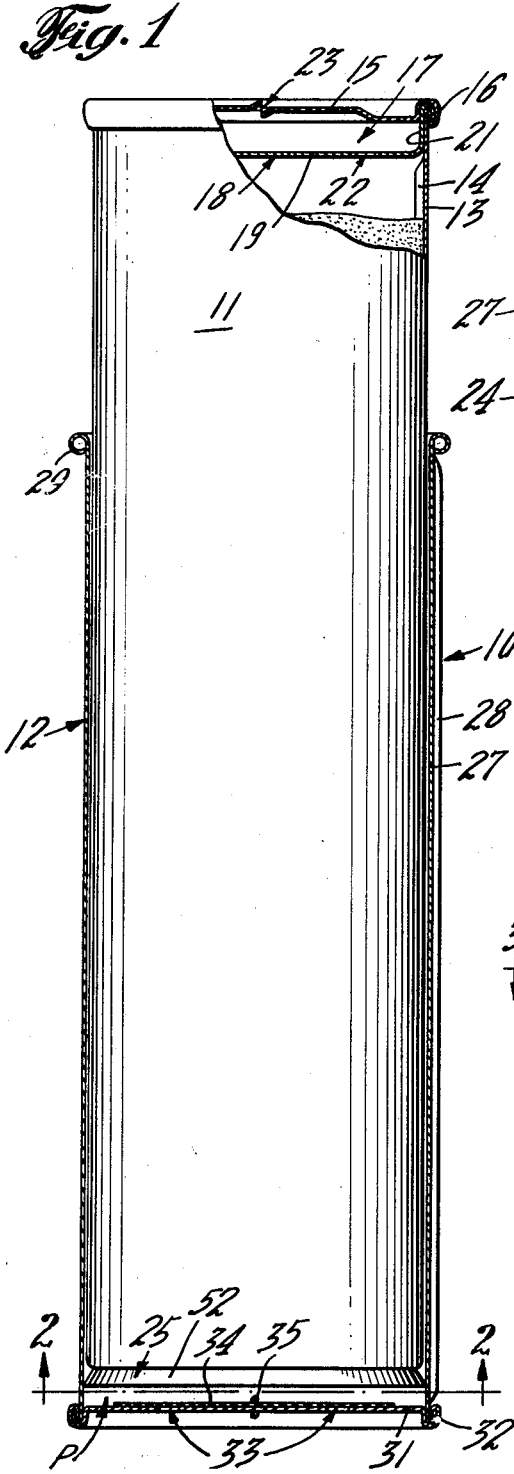
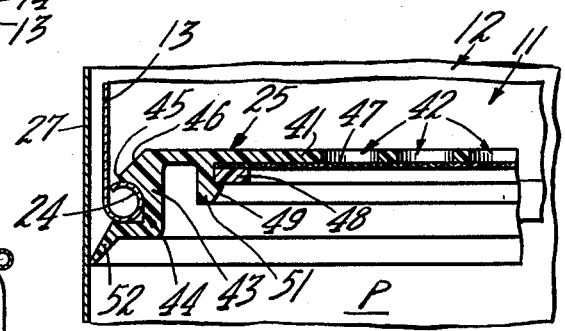
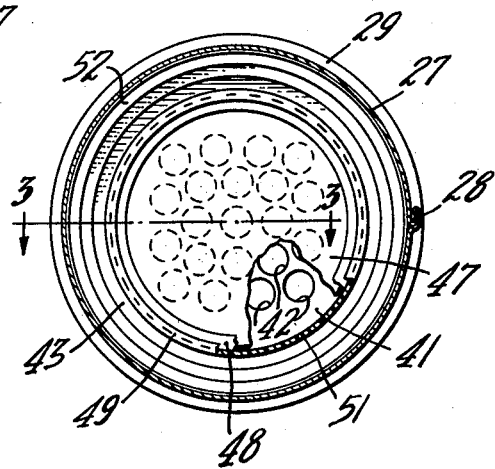
INVENTOR.
RALPH KENNICOTT POTTLE
BY
Edward O. Then
AGENT

United States Patent Office 3,157,318
Patented Nov. 17, 1964

3,157,318
DUST GUN
Ralph Kennicott Pottle, Georgetown, Conn., assignor to American Can Company, New York, N.Y., a corporation of New Jersey
Filed June 29, 1962, Ser. No. 206,486
5 Claims. (Cl. 222—193)

This invention relates to a telescopic type of dust gun for storing and disseminating insecticidal dust or powder and has particular reference to a one piece resilient fitting which is easily inserted in an end of an inner container of the dust gun for closing the same and for providing a packing between the inner container and an outer telescoping container.

Many of the agricultural and insecticidal dusts or powders now on the market are packed in tubular dispensing containers provided at a discharge end with a dispensing opening or orifice through which the dust mixed with air is discharged. At its opposite, inlet end, the tubular container is provided with a closure having an opening which permits air for mixing with and dispensing the dust to be forced into and through the tubular container. This opening may be covered with a suitable air pervious element such as a woven fabric, filter or screen to permit the ingress of air into the container while preventing the escape of dust through the opening. This inlet end of the container usually is surrounded with a telescoping sleeve or cylinder which is closed at one end, except for an inlet opening which is covered by a flap-type of check valve. The purposes of this valve is to permit air to be drawn through this end of the sleeve into a chamber which is created when the telescoping sleeve is withdrawn, but to prevent the escape of any substantial amount of air therethrough when the withdrawn sleeve is telescoped again upon the tubular container. Hence, by a repeated pumping action or reciprocation of the sleeve on the container, air is pumped through the container to discharge a mixture of the air and dust through the discharge opening.

One of the difficulties with many of the prior art dust guns of this general character is that in order to operate efficiently and to prevent escape of air between their telescoping side walls, the reciprocating parts are required to be relatively close fitted. This tends to create a considerable amount of friction between these parts and thus requires an appreciable effort to operate them.

Another difficulty of the prior art dust guns is that they canot be refilled and when they become empty they are usually discarded, which makes their use quite expensive.

The present invention contemplates overcoming these difficulties and disadvantages by providing a resilient snap-on plastic fitting for closing the inlet end of the inner container, the fitting being easy to insert and remove to thereby make possible the refilling of the dust gun and also being provided with an integral packing which seals the space between the telescoping container parts, thereby permitting greater clearance therebetween for free and easy operation of the dust gun.

An object of the invention therefore is the provision of a resilient snap-on plastic fitting for closing the inlet end of the inner container of a telescoping type of dust gun having an inner container or cartridge and an outer container or sleeve.

A further object of the invention is the provision of such a fitting which is easy to insert and remove to permit the filling and refilling of the inner container with insecticidal dust or powder.

Still another object of the invention is the provision of a resilient plastic fitting preferably formed of polyethylene for closing an end of the inner container of a dust gun, the fitting having a flared peripheral edge portion which is engageable with the inner surface of the side wall of the outer container and which functions as a packing element to permit a substantial clearance between the wall surfaces of telescoping containers for easy operation thereof.

Numerous other objects and advantages of the invention will be apparent as it is better understood from the following description, which, taken in connection with the accompanying drawings, discloses a preferred embodiment thereof.

Referring to the drawings:

FIGURE 1 of the drawings shows a filled dust gun embodying the instant invention, with parts broken away and with parts in section;

FIG. 2 is a transverse horizontal section taken substantially along the line 2—2 of FIG. 1; and FIG. 3 is an enlarged fragmentary sectional detail taken substantially along the line 3—3 in FIG. 2.

As a preferred or exemplary embodiment of the instant invention, the drawings illustrate a telescoping type of dust gun, generally designated by the number 10, which comprises an inner container or dust holding cartridge 11 and an outer container or pump sleeve 12. Both of these containers preferably are made of sheet metal such as tin plate or the like, although they may also be made from fibre, hard plastic, or other suitable materials, if desired.

The inner container 11 comprises a tubular body 13 which is made from a body blank having its opposite ends secured together to form a longitudinal side seam 14. Such a seam preferably is located on the inside of the tubular body 13 in order to provide a smooth exterior cylindrical surface on this inner container 11.

This inner container 11 is closed at its top or discharge end by a metal end member 15 which is secured to the end of the container body 13 in a double seam 16. The end member 15 also serves as one wall of a mixing chamber 17 which is located at this discharge end of the container. To create the chamber 17, a dish-like element 18 having a depressed panel wall 19 and an annular countersink wall 21 is provided, the upper peripheral edge of the countersink wall 21 being included and secured in the end seam 16.

The panel wall 19 is provided with a plurality of perforations 22 to permit the ingress of air and dust into the mixing chamber 17. It is in this chamber 17 that a supply of the dust is thoroughly mixed with air preparatory to dispersion of the mixture through a discharge opening 23 centrally located in the end member 15.

The opposite or inlet end of the inner container 11 (FIG. 3) terminates in an inwardly curled edge 24. It is this curled edge 24 that provides a locking seat onto which a substantially one piece fitting or closure element 25 is secured. This fitting 25 will be described fully hereinafter.

The outer container 12, like the inner container 11, comprises a tubular body 27 made from a body blank having its opposite ends secured together in a longitudinal side seam 28 (see FIGS. 1, 2). This seam 28 preferably is located on the outside of the tubular body 27 in order to provide a smooth interior cylindrical surface on this outer container 12. Hence, it will be seen that with a smooth, cylindrical exterior surface on the inner container body 13 and a smooth cylindrical interior surface on the exterior container body 27, these container bodies may be reciprocated freely, without binding, in telescoping relation for dispensing purposes.

Since one end of the outer container 12 must remain open to receive the inner container 11 (FIG. 1), this end is terminated in a smooth outwardly curled edge 29. At its opposite, or inlet end, the outer container 12 is closed by a metal end member 31 which is secured thereto in a double seam 32.

The end member 31 preferably has a plurality of inlet openings 33 formed therein to permit air to be drawn into a pressure chamber P which is created within the outer container 12 as it is withdrawn from its fully telescoped position on the inner container 11 (FIG. 1). The inlet openings 33 normally are covered by a flap-type check valve 34 which may be in the form of a flexible disc of paper, rubber, plastic or the like which is secured to the end 31 by a staple 35 which is preferably positioned at the center of the flexible disc.

The fitting or closure element 25 (FIGS. 1, 2 and 3) preferably is formed of resilient plastic material such as polyethylene, rubber or the like, so that it may be inserted easily into the end of the inner container 11 and also readily removed therefrom for the purpose of facilitating filling and/or refilling the inner container 11. This fitting 25 has a panel wall 41 provided with a plurality of openings 42 formed therein. The panel wall 41 is formed integral with a surrounding, depending, annular wall 43 which is provided with a peripheral groove 44, the upper portion of the wall 43 comprising an annular projection 45 for snap-in engagement over the curled edge 24 of the inner container 11. In order to facilitate insertion of the fitting 25 into the inner container 11, the edge of the annular wall 43 preferably is beveled as at 46.

The openings 42 in the panel wall 41 of the fitting 25 preferably are covered by a fabric screen or diaphragm 47 which permits the passage of air into the inner container 11, while preventing the escape of dust through these openings 42. This fabric screen 47 is secured in place against the panel wall 41 by means of a resilient snap ring 48 which preferably is formed of plastic and is held in place by a shoulder 49 spaced downwardly from the panel wall 41.

The shoulder 49 preferably is annular in form and is located at the bottom end of a concentric wall 51 which is spaced radially inwardly of the wall 43 (FIG. 3). If desired, the shoulder 49 may be formed integrally with the wall 43, in which event the separate wall 51 would be omitted. Also, instead of being a continuous shoulder, it may comprise a plurality of individual, arcuately spaced shoulder elements.

The annular wall 43 of the fitting 25 also provides a resilient packing element or gasket for the dust gun. For this purpose, the bottom portion of the wall 43 is flared outwardly as at 52 (FIG. 3) to extend beyond the exterior surface of the inner container body 13 so that it will frictionally engage with the interior surface of the outer container body 27.

It is readily seen that with the flaring peripheral edge 52 formed on the fitting 25, a suitably airtight seal is produced which prevents the escape of air between the inner and outer containers 11, 12, respectively, as they are reciprocated relative to each other to pump air from the chamber P into and through the inner container 11. The provision of such a packing element permits a substantial clearance between the tubular walls of the inner and outer containers 11, 12, thereby reducing the friction contact therebetween to a minimum so that the container parts may be telescoped easily without binding. It is also seen that this flared peripheral edge 52 provides for easy gripping of the fitting 25 to facilitate its removal from the inner container 11 for refilling purposes.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A fitting for a dust gun having an inner container wherein powdered materials are stored and disseminated under pressure and a pump sleeve telescopically surrounding said inner container, said fitting comprising a closure formed of resilient material and having a central panel wall and an outer surrounding wall, locking means on said surrounding wall for snap-in engagement with an end of said inner container, a perforation in said panel wall, an air pervious diaphragm secured to said panel wall for covering said perforation and preventing the discharge of the powdered materials through said perforation but permitting the ingress of air under pressure into the container, and a packing gasket formed integrally with said fitting and engageable against said pump sleeve for preventing the passage of air between said inner container and said pump sleeve.

2. The fitting of claim 1 wherein said locking means on said surrounding wall comprises an annular groove which is engageable with an inwardly curled edge at the end of the container.

3. The fitting of claim 2 wherein said air pervious diaphragm is secured in place by a ring which is engageable beneath shoulder means disposed in spaced relation to said panel wall.

4. The fitting of claim 2 wherein the said shoulder means is formed in a wall which is concentric to and disposed inwardly of said surrounding wall.

5. A dust gun for dispensing powdered materials and the like in dust form, comprising in combination, an inner container wherein said materials are stored, said inner container having a tubular side wall, an outer container surrounding said inner container and enclosing one end and at least a portion of the side wall of said inner container, said outer container having a tubular side wall disposed in relatively loose fitting relationship to the tubular side wall of said inner container and being telescopically reciprocable relative to said inner container to force air under pressure into said inner container, and a fitting formed of resilient material having an annular groove which is engageable with an inwardly curled edge on the enclosed end of said inner container, said fitting having a panel wall provided with perforations therein and having an air pervious diaphragm secured to said panel wall for covering said perforations and for permitting the ingress of air under pressure into said inner container but preventing the escape of the powdered materials therethrough, said fitting also having a flared peripheral edge portion formed integrally therewith and extending radially outwardly beyond the tubular side wall of said inner container and having resilient engagement with the tubular side wall of said outer container to prevent the escape of air between said walls.

References Cited in the file of this patent

UNITED STATES PATENTS

| 2,514,516 | Root | July 11, 1950 |
| 2,518,522 | Cimbura et al. | Aug. 15, 1950 |

FOREIGN PATENTS

| 882,655 | Germany | Dec. 14, 1953 |